(12) United States Patent
Oyamada (10) Patent No.: US 7,999,897 B2
(45) Date of Patent: Aug. 16, 2011

(54) ELECTRO-OPTIC DEVICE AND ELECTRONIC APPARATUS

(75) Inventor: Shin Oyamada, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 250 days.

(21) Appl. No.: 12/412,561

(22) Filed: Mar. 27, 2009

(65) Prior Publication Data

US 2009/0244465 A1 Oct. 1, 2009

(30) Foreign Application Priority Data

Apr. 1, 2008 (JP) ................................. 2008-095033
Feb. 23, 2009 (JP) ................................. 2009-039622

(51) Int. Cl.
 *G02F 1/1343* (2006.01)
(52) U.S. Cl. ........................................ 349/139; 349/162
(58) Field of Classification Search ........................ None
 See application file for complete search history.

(56) References Cited

U.S. PATENT DOCUMENTS

| 5,365,357 A | * | 11/1994 | Ohgawara et al. | 349/111 |
| 6,891,579 B2 | * | 5/2005 | Kwak et al. | 349/44 |
| 2009/0059174 A1 | * | 3/2009 | Shirasaka et al. | 353/20 |

FOREIGN PATENT DOCUMENTS

| JP | 2-123325 A | * | 5/1990 |
| JP | 9-127547 A | | 5/1997 |
| JP | 10-90671 A | | 4/1998 |
| JP | 10-170935 A | | 6/1998 |
| JP | 11-101991 A | * | 4/1999 |
| JP | 2002-6328 A | * | 1/2002 |

* cited by examiner

*Primary Examiner* — Mike Stahl
(74) *Attorney, Agent, or Firm* — AdvantEdge Law Group, LLC (57) ABSTRACT

An electro-optic device includes first electrodes that apply voltage to the liquid crystal layer in the pixel area and second electrodes that apply voltage to the liquid crystal layer in the peripheral area for shielding the peripheral area from light.

8 Claims, 7 Drawing Sheets

ELECTRO-OPTIC DEVICE AND ELECTRONIC APPARATUS

BACKGROUND

1. Technical Field

The present invention relates to an electro-optic device such as a liquid crystal display, and an electronic apparatus such as a liquid crystal projector including the electro-optic device.

2. Related Art

In such an electro-optic device, a plurality of pixel electrodes arranged in matrix are provided on a TFT (Thin Film Transistor) array substrate, a planar area where the pixel electrodes are arranged is an image display area. A frame of the image display area is defined by an interior light shielding film formed on a TFT array substrate and called as a black matrix or a black mask. A frame light shielding film is formed on an opposite substrate, instead of or in addition to such an interior light shielding film.

JP-A-10-90671 is an example of related art.

In the related art, to form such a light shielding film, the number of manufacturing processes or cost increases. Particularly, when it is required to reduce the size of a device or to precisely display an image, a configuration of the device may be complicated or a layout of each member of the device may be restricted. That is, in the above-described technique, there is a technical problem that a number of disadvantages are caused in a manufacturing process.

SUMMARY

An advantage of some aspects of the invention is to provide an electro-optic device and an electronic apparatus capable of shielding a peripheral area from light with a simple configuration.

According to a first aspect of the invention, an electro-optic device includes: first and second substrates that are disposed to face each other; a liquid crystal layer that is disposed between the first and second substrates; first electrodes that are formed on a side of the first substrate facing the liquid crystal layer and apply voltage to the liquid crystal layer in a pixel area; second electrodes that are formed on the side of the first substrate facing the liquid crystal layer and apply voltage for shielding a peripheral area around the pixel area from light to the liquid crystal layer; and a power supply unit that supplies power source potential to the second electrodes to apply the voltage to the liquid crystal layer.

According to the first aspect of the invention, a plurality of data lines and a plurality of scanning lines are provided to intersect each other, image signals are controlled to be supplied from the data lines to the first electrodes in the pixel area, and thus it is possible to display an image in a so-called active matrix manner. More specifically, each pixel is selected by supplying a scanning signal from the scanning line to a gate electrode of a transistor, one source drain area of a semiconductor layer of the transistor is electrically connected to the data line, and the image signal is supplied from the data line to the first electrode through the transistor by electrically connecting the other source drain area and the first electrode to each other. The first electrode applies voltage to the liquid crystal layer on the basis of the image signal. Accordingly, inclination of liquid crystal molecules included in the liquid crystal layer is controlled, thereby displaying an image on the pixel area.

The first electrodes are made of transparent conductive materials such as ITO (Indium Tin Oxide), and are provided in matrix in the pixel area, corresponding to the intersection between the data lines and the scanning lines. The second electrodes are provided in the peripheral area around the pixel area. The peripheral area, where various kinds of driving circuits and the like are provided, does not substantially contribute to display of images.

The power source potential is supplied to the second electrode by the power supply unit. The power supply unit may be a power supply for supplying power used to display an image, such as a driving circuit for driving the pixels in the pixel area, and may be a power supply only for the second electrode. In the other words, any power supply unit capable of supplying power source potential to apply voltage for driving the liquid crystal layer may be used as the power supply unit.

The second electrode applies the voltage to the liquid crystal layer on the basis of the supplied power source potential to shield the peripheral area from light by the liquid crystal layer. Specifically, the second electrode applies voltage for displaying black to the liquid crystal layer in the peripheral area, thereby shielding the peripheral area from light. The liquid crystal layer may perform the black display when voltage is applied. On the other hand, the liquid crystal layer may perform the black display when no voltage is applied. That is, the second electrode can switch whether or not light incident upon the peripheral area passes through the liquid crystal layer, by applying voltage.

Particularly, the light incident upon the peripheral area is blocked by controlling the liquid crystal layer in the peripheral area. Accordingly, even when a light shielding member such as a light shielding film is not provided separately, it is possible to reliably shield the peripheral area from light. Therefore, it is possible to reduce the number of manufacturing processes and manufacturing cost. When the existing power supply wirings are used as the power supply unit, the light shielding can be realized with a simple configuration, as compared with the case of providing the light shielding film. With such a configuration, it is possible to improve the degree of freedom of layout in a design stage.

As described above, according to the first aspect of the invention, the voltage can be applied to the liquid crystal layer in the peripheral area, and the peripheral area is shielded from light by the liquid crystal layer. Accordingly, it is possible to shield the peripheral area from light with the simple configuration.

According to a second aspect of the invention, an electro-optic device includes: first and second substrates that are disposed to face each other; a liquid crystal layer that is disposed between the first and second substrates; first electrodes that are formed on a side of the first substrate facing the liquid crystal layer and apply voltage to the liquid crystal layer in a pixel area; second electrodes that are formed on the side of the first substrate facing the liquid crystal layer and apply voltage for shielding a peripheral area around the pixel area from light to the liquid crystal layer in the peripheral area; and a power supply unit that supplies potential to the second electrodes to apply the voltage to the liquid crystal layer.

According to the second aspect of the invention, in the same manner as the electro-optic device according to the first aspect of the invention, it is possible to control the liquid crystal layer in the peripheral area by the voltage applied to the second electrodes. Accordingly, the light incident upon the peripheral area can be blocked by the liquid crystal layer. Therefore, even when a light shielding member such as a light shielding film is not provided separately, it is possible to reliably shield the peripheral area from light.

In the invention, the potential supplied from the power supply unit to the second electrodes is not particularly limited, and any potential capable of controlling the liquid crystal layer may be used as the potential. That is, the potential supplied to the second electrodes may be supplied by dividing potential used for the other driving in the device, and may be supplied only for control of liquid crystal for light shielding.

As described above, according to the second aspect of the invention, the voltage can be applied to the liquid crystal layer in the peripheral area, and the peripheral area is shielded from light by the liquid crystal layer. Accordingly, it is possible to shield the peripheral area from light with the simple configuration.

In the electro-optic device, it is preferable that at least a part of the second electrodes are electrically connected to each other.

In this case, when the power source potential is supplied to one of the second electrodes, the power source potential is supplied also to the others of the second electrodes connected to the one of the second electrodes, since at least a part of the second electrodes are electrically connected to each other. Accordingly, it is possible to simply the structure in the peripheral area. Preferably, the second electrodes may be formed of a solid type electrode (i.e., one electrode overlapping with the whole surface of the peripheral area).

Preferably, the electro-optic device further includes a seal member that is provided to join the first and second substrates to each other in the peripheral area and is hardened by irradiating with light.

The seal member to join the first and second substrates to each other is provided between the first and second substrates in the peripheral area. Generally, in the seal member, gap materials such as glass fibers or glass beads are dispersed, and the seal member has a function of defining a gap between the first and second substrates.

The seal member is hardened by irradiating with light such as ultraviolet ray. That is, in the manufacturing process, after the seal member is disposed between the first and second substrates, the seal member is irradiated with light through the substrates, thereby hardening the seal member and fixing the first and second substrates.

If a light shielding member such as a light shielding film is formed in the peripheral area, it is difficult to irradiate the seal member with light. That is, light for hardening the seal member may be also blocked.

In this aspect, particularly, the light shielding in the peripheral area is performed by liquid crystal. Accordingly, there is no case where the light for hardening the seal member is blocked by the light shielding film or the like. In addition, since it is possible to switch whether or not light passes through liquid crystal by driving the liquid crystal, it is possible to appropriately irradiate the seal member with light. Therefore, it is possible to more appropriately manufacture the device.

Preferably, the electro-optic device further includes a boundary light shielding film that is at least partially provided in a boundary area positioned at a boundary with the pixel area in the peripheral area and blocks light incident upon the peripheral area.

In this case, the boundary light shielding film is at least partially provided in the boundary area positioned at the boundary with the pixel area in the peripheral area. Generally, the boundary light shielding film is provided in a line shape along the periphery of the pixel area. Such a boundary light shielding film can be formed with a simple process, as compared with a light shielding film of covering the whole peripheral area. In addition, the boundary light shielding rarely interferes disposition of the other members.

The boundary light shielding film is provided, thereby improving light shielding ability in the boundary area. That is, in the boundary area, the light shielding by the liquid crystal and the light shielding by the boundary light shielding film are performed, and thus the light shielding ability is high as compared with the peripheral area other than the boundary area. Accordingly, an image is prevented from being faintly displayed around the boundary area. Therefore, it is possible to display a higher quality image.

In the electro-optic device, it is preferable that the voltage applied to the second electrodes is alternating-current voltage.

In this case, the alternating-current voltage as voltage for driving the liquid crystal layer is applied to the second electrodes. That is, a value of the voltage applied to the second electrodes is periodically varied. Accordingly, it is possible to effectively prevent burn-in caused by continuously applying regular potential. Therefore, it is possible to more appropriately shield the peripheral area from light.

In the electro-optic device, it is preferable that dummy pixels are provided in a dummy pixel area between the pixel area and the peripheral area and are provided with dummy electrodes imitating the first electrodes, the second electrodes are electrically connected to the dummy electrodes, and the power supply unit supplies the potential to the second electrodes through the dummy electrodes.

In this case, the dummy pixels imitating the pixels in the pixel area are provided in the dummy area between the pixel area and the peripheral area. The dummy pixels are provided with the dummy electrodes imitating the first electrodes included in the pixels provided in the pixel area, and generally, are also provided with dummy transistors imitating transistors performing switching control with respect to the pixels. That is, the dummy pixels are configured to perform the same operation as that of the pixels. However, the dummy pixel area in which the dummy pixels are provided is an area unrelated to image display.

The second electrodes are electrical connected to the dummy electrodes in the dummy pixels. The connection portion between the second electrodes and the dummy electrodes may be one or more. Particularly, the potential for light shielding is supplied from the power supply unit to the second electrodes through the dummy electrodes. That is, the power supply unit supplies the potential to the dummy electrodes, thereby indirectly supplying the potential to the second electrodes.

With such a configuration, since the potential for light shielding is supplied through the dummy electrodes, a circuit or wiring for supplying the potential to the second electrodes may not be provided separately. Accordingly, it is possible to realize the light shielding of the peripheral area by controlling the liquid crystal layer with a simpler configuration.

In the electro-optic device, it is preferable that the power supply unit includes a power supply circuit provided on the first substrate.

In this case, since the power supply circuit provided in the first substrate is included in the power supply unit, it is possible to more appropriately supply the potential to the second electrodes using the power supply circuit. Generally, the power supply circuit is provided as a circuit only for supplying light shielding potential.

Specifically, the power supply circuit has a voltage increase and decrease function, and it is possible to easily supply potential with a more appropriate value. In addition, the power supply circuit has an AC-DC conversion function, and thus it is possible to easily supply alternating-current voltage.

According to another aspect of the invention, an electronic apparatus includes the electro-optic device.

In this case, since the electronic apparatus includes the electro-optic device, various kinds of electronic apparatus such as a projector type display, a television, a mobile phone, an electronic scheduler, a word processor, a view finder, a monitor direct-view video tape recorder, a work station, a television phone, a POS terminal, and a touch panel, which are capable of reducing the number of manufacturing processes and manufacturing cost. In addition, as the electronic apparatus, it is possible to realize an electrophoresis apparatus such as an electronic paper.

The other advantage and operation of the invention are clarified from the following exemplary embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.
Electro-Optic Device An electro-optic device according to the embodiment will be described with reference to FIG. 1 to FIG. 8. In the following embodiment, a driving circuit built-in type and TFT active matrix driving type liquid crystal device as an example of the electro-optic device of the invention will be described by way of example.

Figure 1:
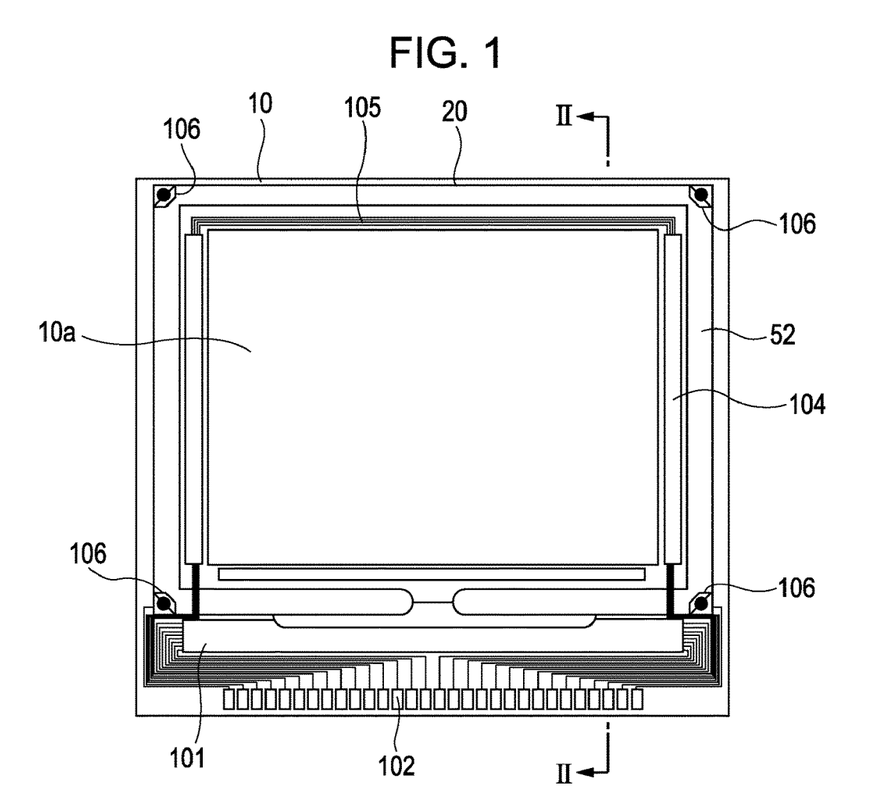
FIG. 1 is a plan view illustrating an overall configuration of an electro-optic device according to an embodiment.
Figure 2:
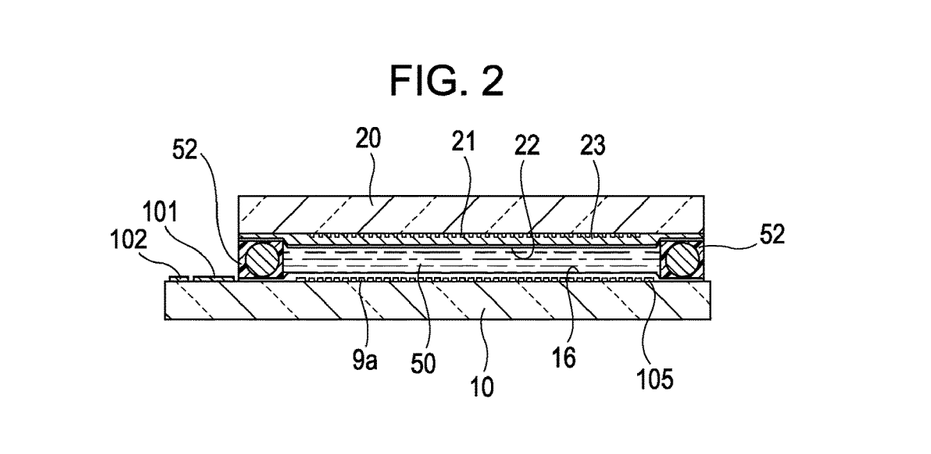
FIG. 2 is a cross-sectional view taken along the line II-II shown in FIG. 1.

First, the whole configuration of the electro-optic device according to the embodiment will be described with reference to FIG. 1 and FIG. 2. FIG. 1 is a plan view illustrating the whole configuration of the electro-optic device according to the embodiment. FIG. 2 is a cross-sectional view taken along the line II-II shown in FIG. 1.

As shown in FIG. 1 and FIG. 2, in the electro-optic device according to the embodiment, a TFT array substrate 10 and an opposite substrate 20 are disposed to face each other. The TFT array substrate 10 is, for example, a transparent substrate such as a glass substrate and a quartz substrate, a silicon substrate, and the like. The opposite substrate 20 is, for example, a transparent substrate such as a quartz substrate and a glass substrate. A liquid crystal layer 50 is provided between the TFT array substrate 10 and the opposite substrate 20. The liquid crystal layer 50 includes, for example, liquid crystal obtained by mixing one or more kinds of nematic liquid crystal, and is in a predetermined arrangement state between a pair of arrangement films. The TFT array substrate 10 and the opposite substrate 20 are joined to each other by a seal member 52 provided in a seal area around an image display area 10a where a plurality of pixel electrodes as an example of the first electrodes of the invention are provided. The image display area 10a is an example of the pixel area of the invention.

The seal member 52 is formed of, for example, ultraviolet hardening resin or the like to join both substrates to each other. In a manufacturing process, the seal member 52 is applied onto the TFT array substrate 10, and then is hardened by irradiating with ultraviolet ray or the like. In the seal member 52, gap materials such as glass fibers or glass beads are dispersed to set a gap (i.e., gap between substrates) between the TFT array substrate 10 and the opposite substrate 20 to a predetermined value. The gap materials may be disposed in the image display area 10a or a peripheral area around the image display area 10a, in addition to or instead of the mixing into the seal member 52.

In the peripheral area, a data line driving circuit 101 and an external circuit connection terminal 102 are provided in an area outside the seal area where the seal member 52 is disposed, along one side of the TFT array substrate 10. Two scanning line driving circuits 104 are provided along two sides adjacent to the one side. To connect the two scanning line driving circuits 104 provided on both sides of the image display area 10a to each other, a plurality of wirings 105 are provided along the other side of the TFT array substrate 10.

On the TFT array substrate 10, up-down conduction terminals 106 for connecting both substrates to each other by up-down conduction materials are provided in areas facing four corners of the opposite substrate 20. The TFT array substrate 10 and the opposite substrate 20 are electrically connected to each other by the up-down conduction terminals.

In FIG. 2, a buildup structure including pixel switching TFTs as driving elements, scanning lines, data lines, and the like is formed on the TFT array substrate 10. Although a detailed configuration of the buildup structure is not shown in FIG. 2, pixel electrodes 9a formed of transparent materials such as ITO are formed for pixels in a island shape with a predetermined pattern, on the buildup structure.

The pixel electrodes 9a are formed in the image display area 10a on the TFT array substrate 10, to face the opposite electrodes 21. An arrangement film 16 is formed to cover the pixel electrodes 9a on a surface facing the liquid crystal layer 50 in the TFT array substrate 10, that is, on the pixel electrodes 9a. In the electro-optic device according to the embodiment, particularly, the same electrodes as the pixel electrodes 9*a* are formed in a peripheral area around the image display area 10*a*. A configuration of the peripheral area will be described later in detail.

A light shielding film 23 is formed on a surface facing the TFT array substrate 10 in the opposite substrate 20. The light shielding film 23 is formed in a lattice shape in a plan view of the facing surface of the opposite substrate 20. In the opposite substrate 20, a non-opening area is defined by the light shielding film 23, and the area divided by the light shielding film 23 becomes an opening area allowing light outgoing from a projector lamp or a direct-view back light to pass. The light shielding film 23 may be formed in a strip shape, and the non-opening area may be defined by the light shielding film 23 and various kinds of constituent elements such as data lines provided on the TFT array substrate 10 side.

The plurality of opposite electrodes 21 formed of transparent materials such as ITO are formed on the light shielding film 23 to face the plurality of pixel electrodes 9*a*. On the light shielding film 23, a color filter (not shown in FIG. 2) may be formed in an area including a part of the opening area and the non-opening area to perform color display in the image display area 10*a*. An arrangement film 22 is formed on the opposite electrodes 21 on the opposite surface of the opposite substrate 20.

A sample circuit sampling image signals on image signal lines and supplying the sampling signals to the data lines, a free-charge circuit supplying free-charge signals with a predetermined voltage level to the plurality of data lines prior to the image signals, and a test circuit for examining quality, defects, and the like of the electro-optic device in the way of manufacturing or at the time of shipment may be formed on the TFT array substrate 10 shown in FIG. 1 and FIG. 2, in addition to the driving circuits such as the data line driving circuit 101 and the scanning line driving circuit 104.

Figure 3:
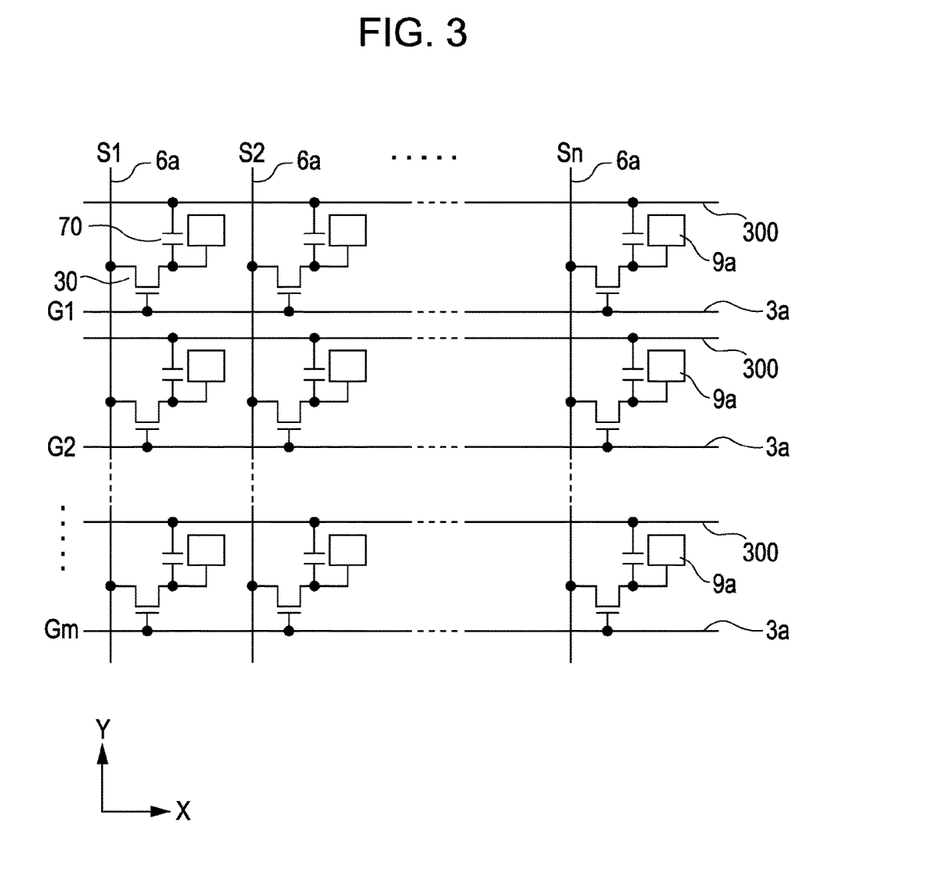
FIG. 3 is an equivalent circuit diagram of various elements and wirings in a plurality of pixels constituting an image display area of the electro-optic device according to the embodiment.

Subsequently, an electrical configuration of a pixel portion of the electro-optic device according to the embodiment will be described with reference to FIG. 3. FIG. 3 is an equivalent circuit diagram of various elements and wirings in the plurality of pixels formed in matrix and constituting the image display area of the electro-optic device according to the embodiment.

In FIG. 3, the pixel electrode 9*a* and a TFT 30 are formed for each of the plurality of pixels formed in matrix and constituting the image display area 10*a*. The TFT 30 is electrically connected to the pixel electrode 9*a*, and controls the pixel electrode 9*a* to be switched at the operating time of the electro-optic device according to the embodiment. The data line 6*a* to which an image signal is supplied is electrically connected to a source of the TFT 30. Image signals S1, S2, . . . , Sn input to the data lines 6*a* may be supplied in this order, and may be supplied for each group with respect to the plurality of data lines 6*a* adjacent to each other.

A gate of TFT 30 is electrically connected to a scanning line 3*a*, and the electro-optic device is configured to apply scanning signals G1, G2, . . . , Gm in pulse to the scanning lines 3*a* in this order at a predetermined time. The pixel electrode 9*a* is electrically connected to a drain of the TFT 30. The image signals S1, S2, . . . , Sn supplied from the data lines 6*a* are input at a predetermine time, by turning off the TFT 30 that is a switching element for a predetermined period. The image signals S1, S2, . . . , Sn with a predetermined level input to the liquid crystal as an example of an electro-optic material through the pixel electrodes 9*a* are kept between the pixel electrodes 9*a* and the opposite electrodes formed on the opposite substrate for a predetermined period.

Arrangement and regularity of molecule groups of the liquid crystal constituting the liquid crystal layer 50 (see FIG. 2) are varied on the basis of a level of applied voltage, thereby modulating light for gradient display. In case of a normally white mode, transmissivity with respect to incident light is decreased on the basis of voltage applied to a unit of each pixel. In case of a normally black mode, transmissivity with respect to incident light is increased on the basis of voltage applied to a unit of each pixel. Generally, light with contrast based on the image signal is outgoing from the electro-optic device.

To prevent the kept image signals from leaking, an accumulation capacitor 70 is added parallel to a liquid crystal capacitor formed between the pixel electrode 9*a* and the opposite electrode 21 (see FIG. 2). The accumulation capacitor 70 is a capacitance element serving as a keeping capacitor for temporarily keeping potential of each pixel electrode 9*a* according to supply of the image signal. One electrode of the accumulation capacitor 70 is electrically connected to the drain of the TFT 30 parallel to the pixel electrode 9*a*, and the other electrode is electrically connected to a potential-fixed capacitance line 300 so as to be constant potential. According to the accumulation capacitor 70, it is possible to improve a potential keeping characteristic in the pixel electrode 9*a*, and to improve a display characteristic such as improvement of contrast and reduction of flicker.

Figure 4:
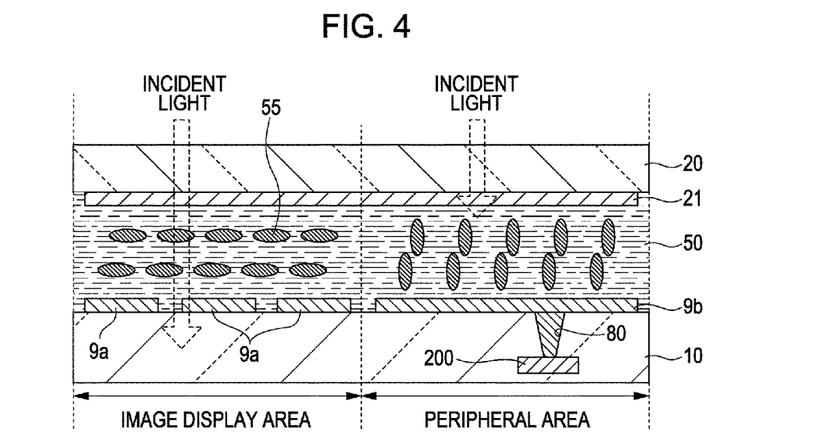
FIG. 4 is a cross-sectional view conceptually illustrating liquid crystal molecules when a liquid crystal layer in a peripheral area blocks light.
Figure 5:
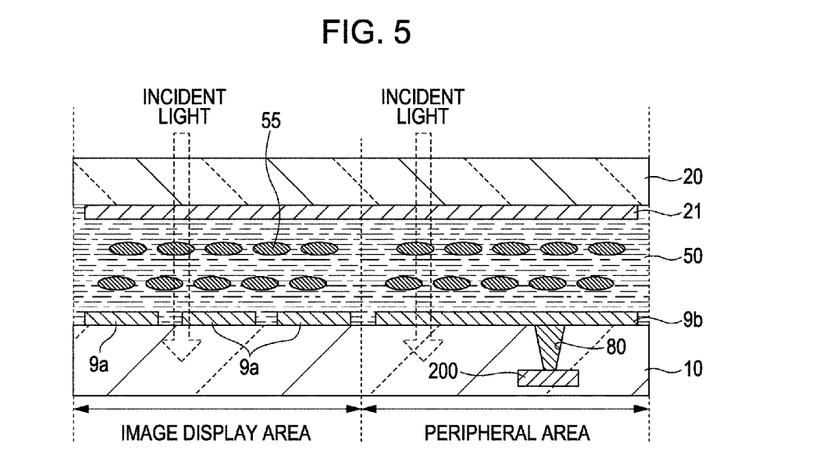
FIG. 5 is a cross-sectional view conceptually illustrating liquid crystal molecules when light passes through the liquid crystal layer in the peripheral area.
Figure 6:
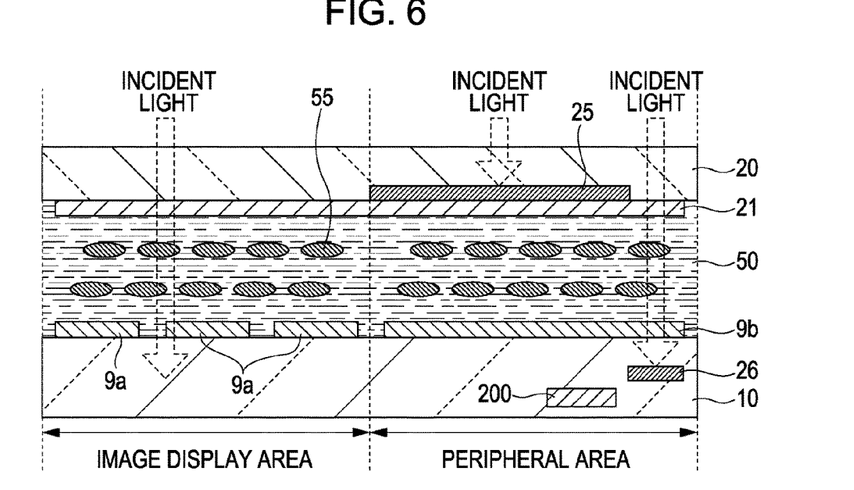
FIG. 6 is a cross-sectional view illustrating a configuration of an electro-optic device according to a comparative example.
Figure 7:
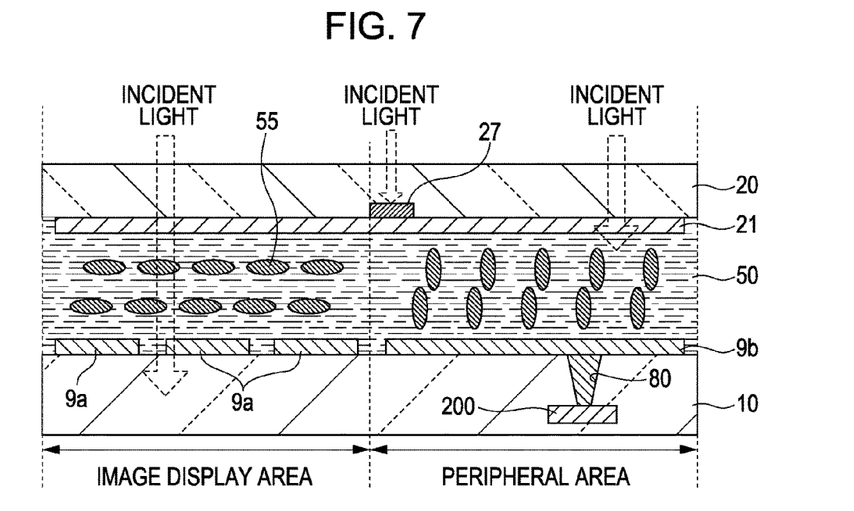
FIG. 7 is a cross-sectional view illustrating a first modified example of the electro-optic device according to the embodiment.
Figure 8:
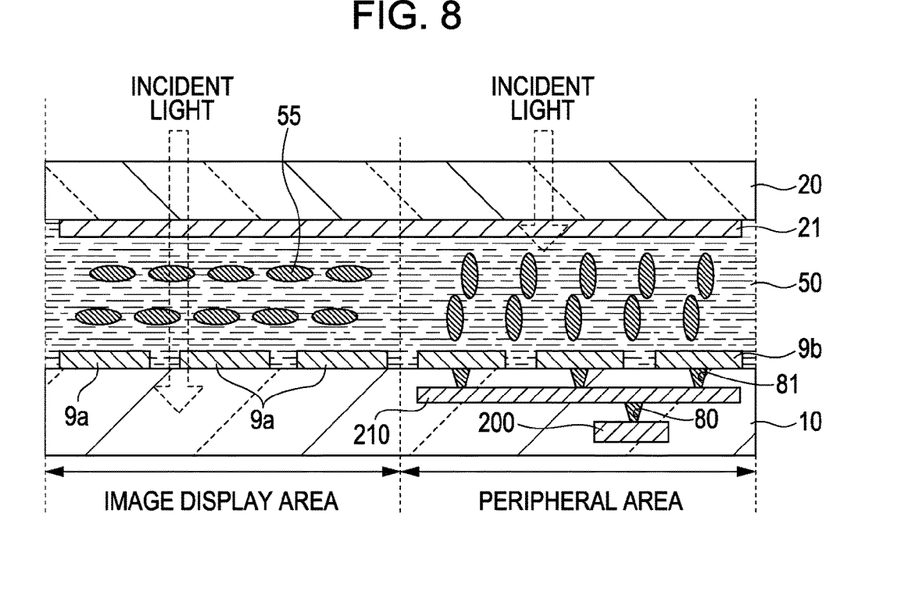
FIG. 8 is a cross-sectional view illustrating a second modified example of the electro-optic device according to the embodiment.
Figure 9:
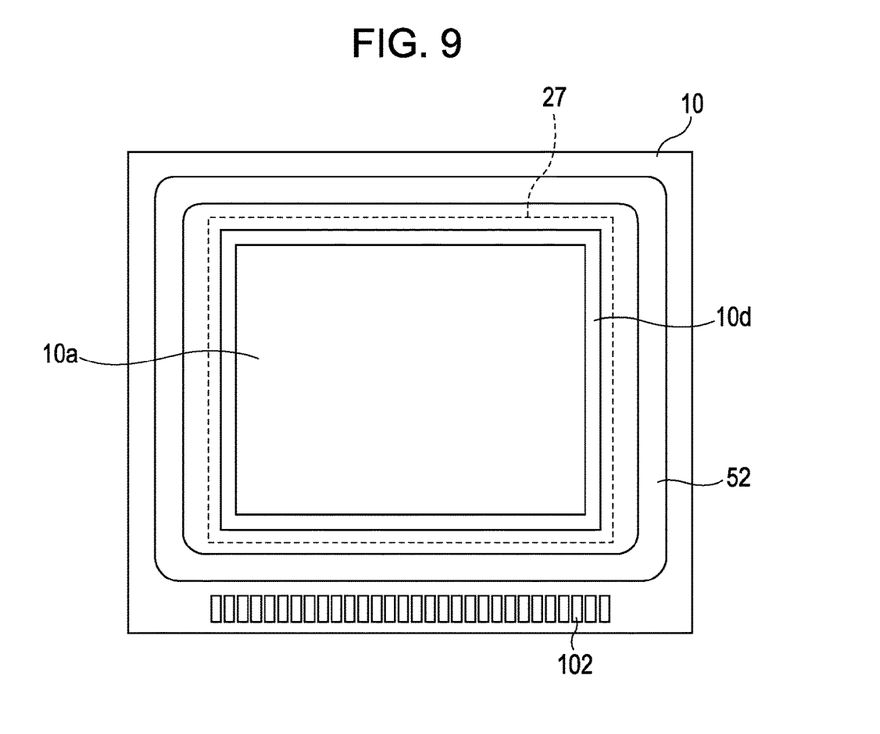
FIG. 9 is a plan view illustrating a modified example of the electro-optic device according to the embodiment.
Figure 10:
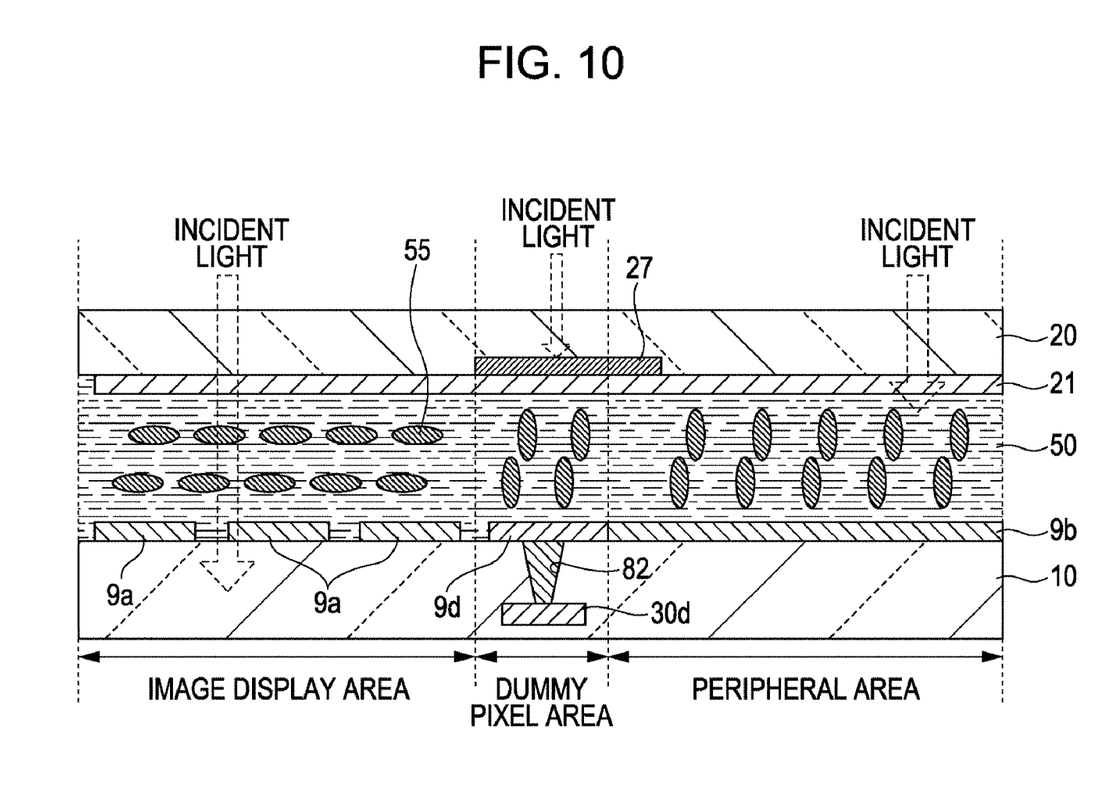
FIG. 10 is a cross-sectional view conceptually illustrating a configuration of the electro-optic device according to the modified example shown in FIG. 9.

Next, a more detailed configuration and operation of the electro-optic device according to the embodiment will be described with reference to FIG. 4 to FIG. 8. FIG. 4 is a cross-sectional view conceptually illustrating liquid crystal molecules when the liquid crystal layer in the peripheral area blocks light. FIG. 5 is a cross-sectional view conceptually illustrating liquid crystal molecules when light passes through the liquid crystal layer in the peripheral area. FIG. 6 is a cross-sectional view illustrating a configuration of an electro-optic device according to a comparative example. FIG. 7 and FIG. 8 are cross-sectional views illustrating modified examples of the electro-optic device according to the embodiment. FIG. 9 is a plan view illustrating a modified example of the electro-optic device according to the embodiment. FIG. 10 is a cross-sectional view conceptually illustrating a configuration of the electro-optic device according to the modified example shown in FIG. 9. In FIG. 4 to FIG. 10, only constituent elements necessary for description are shown, and the detailed members on the substrate as shown in FIG. 1 and FIG. 2 are appropriately omitted.

As shown in FIG. 4, in the electro-optic device according to the embodiment, there is the liquid crystal layer 50 also in the peripheral area (i.e., area where the data line driving circuit 101 or the scanning line driving circuit 104 are provided in FIG. 1) around the image display area 10*a*. The peripheral electrode 9*b* as an example of the second electrode of the invention and the opposite electrode 21 are provided on the TFT array substrate 10 and the opposite substrate 20 pinching the liquid crystal layer. The peripheral electrode 9*b* is formed as a solid type electrode in the peripheral area, and is electrically connected to a power supplying wiring 200 as an example of the power supply unit of the invention disposed on the TFT array substrate 10 through a contact hole 80.

When an image is displayed, voltage based on the image is applied to the pixel electrode 9*a* in the image display area 10*a* and the liquid crystal molecules 55 in the liquid crystal layer 50 are controlled. More specifically, the liquid crystal molecules 55 are controlled to be inclined at different angles on the basis of the value of the applied voltage. Accordingly, incident light from a light source or the like is polarized to display the image.

The peripheral area is shielded from light so that the light does not enter the data line driving circuit 101 or the scanning line driving circuit 104. That is, even if incident light enters the peripheral area, the incident light does not pass through the peripheral area and is not outgoing.

Specifically, the power source potential is supplied from the power supply wiring 200 to the peripheral electrode 9b through the contact hole 80. The peripheral electrode 9b applies voltage to the liquid crystal layer 50 on the basis of the supplied power source potential, and controls the liquid crystal molecules 55 so that light does not pass through the liquid crystal layer 50 (e.g., black display). Accordingly, the incident light is blocked by the liquid crystal layer 50, and thus does not reach the TFT array substrate 10. Therefore, it is possible to effectively prevent discomfort of the device caused by light leak current or the like. In addition, since the incident light is not outgoing from the device, it is possible to prevent quality of the image displayed by light leakage or the like from deteriorating.

In FIG. 5, when the applying of the voltage by the peripheral electrode 9b is interrupted, the incident light is allowed to pass through the liquid crystal layer 50. With such a configuration, at the time of irradiating with ultraviolet ray to harden the seal member 52 (see FIG. 1 and FIG. 2) provided between the TFT array substrate 10 and the opposite substrate 20, it is possible to prevent ultraviolet ray from being blocked at the time of irradiating with ultraviolet ray. Therefore, it is possible to appropriately harden the seal member 52.

In the embodiment, the manner of performing the light shielding by applying the voltage to the peripheral electrode 9b, that is, the case where the liquid crystal is in the normally white mode has been described by way of example. However, in case of a normally black mode, it is possible to appropriately shield the peripheral area from light by performing an operation opposite to the above-described operation. Any liquid crystal capable of performing white display (i.e., display of allowing incident light to pass) and black display (i.e., display of allowing incident light not to pass), such as a TN (Twisted Nematic) mode and a VA (Vertical Alignment) mode may be used as the liquid crystal in the liquid crystal layer 50.

In FIG. 6, if the power supply wiring 200 is not connected to the peripheral electrode 9b, the liquid crystal layer 50 can be driven. Accordingly, it is required to provide a light shielding member separately to shield the peripheral area from light. As shown in FIG. 6, when incident light is blocked by the light shielding film 25 provided on the opposite substrate 20 side and the light shielding film 26 provided on the TFT array substrate 10, a process for providing the light shielding films 25 and 26 is added to the manufacturing process. Accordingly, the manufacturing process is highly complicated and cost is increased. In addition, when the light shielding films 25 and 26 are disposed, layout of the other members is restricted. Therefore, the degree of freedom of layout in design is decreased. After the light shielding films 25 and 26 are provided, the peripheral area is constantly in a light shielding state. Accordingly, the light shielding state (see FIG. 4) and the state (see FIG. 5) of allowing incident light to pass cannot be switched.

In the electro-optic device according to the embodiment, the power supply wiring 200 and the peripheral electrode 9b are electrically connected to each other by the contact hole 80, as compared with the comparative example. Accordingly, it is possible to realize the electro-optic device with a relatively simple configuration. The potential supplied to the peripheral electrode 9b has only to drive the liquid crystal layer 50, and thus it is possible to use the power supply wiring of the existing driving circuit such as the data line driving circuit 101 and the scanning line driving circuit 104.

In addition, the potential supplied to the peripheral electrode 9b may be supplied using another wiring other than the power supply wiring. That is, the potential supplied to the peripheral electrode 9b may be potential other than the power source potential. Specifically, the potential may be common potential supplied to the opposite electrode 21. For example, when the a circuit only for supplying light shielding potential is provided, it is possible to easily supply appropriate potential as the light shielding potential to the peripheral electrode 9b.

As shown in FIG. 7, in the electro-optic device according to the embodiment, a boundary light shielding film 27 may be provided at a boundary with the image display area 10a in the peripheral area. When the boundary light shielding film is provided, it is possible to improve light shielding ability in the boundary between the image display area 10a and the peripheral area. Accordingly, it is possible to more clearly display a contour of the displayed image. Therefore, it is possible to display a high quality image.

As shown in FIG. 8, the peripheral electrodes 9b are not the solid type electrode, the peripheral electrodes 9b may be provided in the same pattern as that of the pixel electrodes 9a. When the peripheral electrode 9b are provided as described above, the power source potential is supplied to each of the peripheral electrodes 9b in an order of a power supply wiring, a contact hole 80, a relay layer 210, and a contact hole 81. When the plurality of peripheral electrode 9b are in the same potential, electric power may be supplied from a plurality of power supplies.

As shown in FIG. 9 and FIG. 10, a dummy image area 10d where dummy pixels are disposed may be provided between the image display area 10a and the peripheral area. In this case, when the dummy electrodes 9d in the dummy pixels are electrically connected to the peripheral electrodes 9b, it is not necessary to separately provide a wiring for supplying potential to the peripheral electrodes 9b.

Specifically, in the dummy pixels, when potential (e.g., potential for operating the dummy pixel) supplied from dummy transistor 30d to the dummy electrode 9d through the contact hole 82 is configured to be supplied to the peripheral electrode 9b through the dummy electrode 9d, the liquid crystal molecules 55 in the peripheral area are controlled by the potential supplied to the dummy electrode 9d and thus it is possible to shield the peripheral area from light. That is, when potential for performing black display is supplied to the dummy electrode 9d, the peripheral area is shielded from light by the potential supplied to the peripheral electrode 9b through the dummy electrode 9d. Accordingly, the power supply wiring 200 shown in FIG. 4 to FIG. 8 and the contact holes 80 and 81 electrically connecting the power supply wiring 200 and the peripheral electrode 9b to each other are not necessary. Accordingly, it is possible to realize the light shielding of the peripheral area with a simpler configuration.

In addition, when the light shielding film 27 is provided to extend from the dummy pixel area 10d to a part of the peripheral area, it is possible to perform more effective light shielding. Generally, the dummy pixels are provided around the image display area 10a as much as 4 to 12 pixels. For this reason, when the light shielding film 27 has a width of about 300 to 800 μm, it is possible to more appropriately perform the light shielding.

As described above, the electro-optic device according to the embodiment is configured to apply the voltage to the liquid crystal layer 50 in the peripheral area, and thus the light shielding of the peripheral area is realized by the liquid crystal layer 50. Accordingly, it is possible to shield the peripheral area from light with a simple configuration.

Electronic Apparatus

Figure 11:
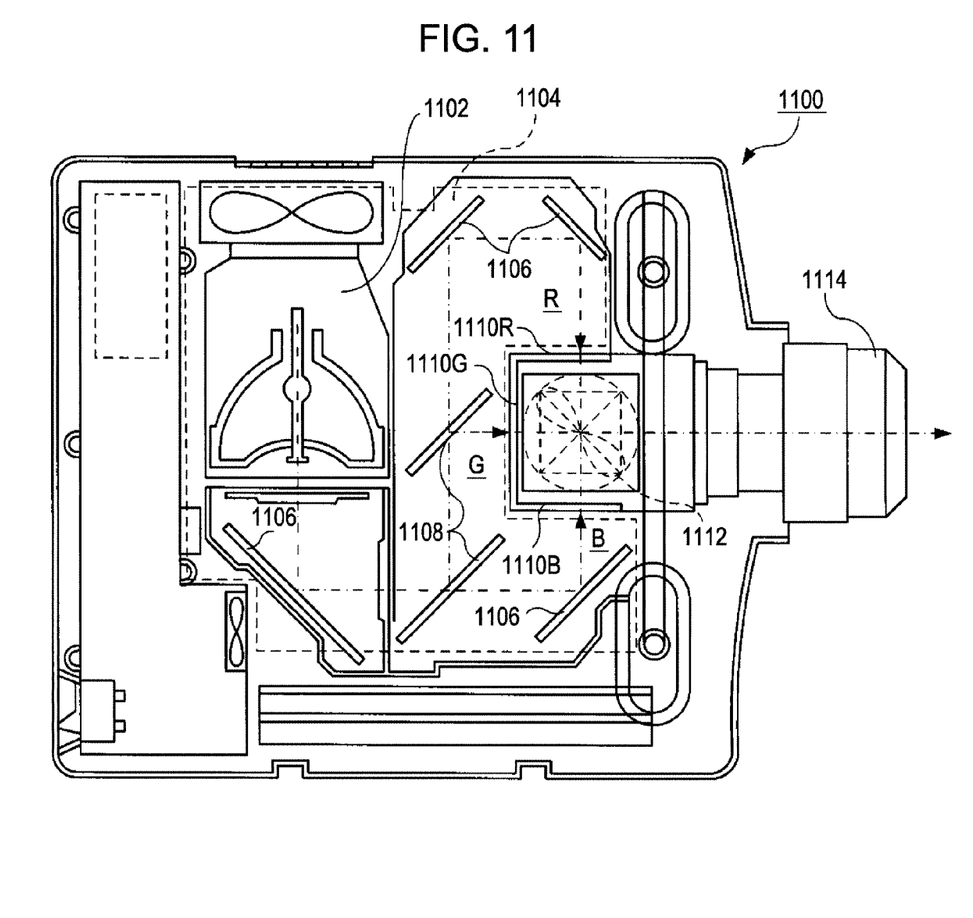
FIG. 11 is a plan view illustrating a configuration of a projector as an example of an electronic apparatus to which the electro-optic device is applied.

Next, a case of applying a liquid crystal device as the above-described electro-optic device to various kinds of electronic apparatuses will be described. FIG. 11 is a plan view illustrating a configuration example of a projector. Hereinafter, a projector using this liquid crystal device as a light valve will be described.

As shown in FIG. 11, a lamp unit 1102 formed of a white light source such as a halogen lamp is provided in a projector 1100. A projecting light outgoing from the lamp unit 1102 is divided into three primary colors of RGB by four sheets of minor 1106 disposed in a light guide 1104 and two sheets of dichroic mirror 1108, and the divided light enters liquid crystal panels 1110R, 1110B, and 1110G as light valves corresponding to the primary colors.

A configuration of the liquid crystal panels 1110R, 1110B, and 1110G is equivalent to that of the above-described liquid crystal device, and they are driven by primary color signals of R, G, and B colors supplied from an image signal processing circuit. The light modulated by the liquid crystal panels enters a dichroic prism 1112 in 3 directions. In the dichroic prism 1112, the light R and B are reflected by 90°, and the light G goes straight. Accordingly, images of colors are synthesized with each other, and thus a color image is projected onto the screen or the like through a transmission lens 1114.

In consideration of images displayed by the liquid crystal panels 1110R, 1110B, and 1110G, the image displayed by the liquid crystal panel 1110G is required to be reversed left and right with respect to the images displayed by the liquid crystal panels 1110R and 1110B.

The liquid crystal panels 1110R, 1110B, and 1110G are not necessarily provided with color filters since light corresponding to each primary color of R, G, and B is input by the dichroic mirror 1108.

In addition to the electronic apparatus described with reference to FIG. 11, there may be apparatuses such as a mobile personal computer, a mobile phone, a liquid crystal television, a view finder, a monitor direct-view video tape recorder, a car navigation apparatus, a pager, an electronic scheduler, a calculator, a word processor, a work station, a television phone, a POS terminal, and an apparatus including a touch panel. The invention is applicable to these various kinds of electronic apparatuses.

The invention is applicable to a reflective liquid crystal display (LCOS), a plasma display (PDP), a field emission display (FED, SED), an organic EL display, a digital micro mirror device (DMD), an electrophoresis device, and the like, in addition to the liquid crystal device described with reference to the embodiment.

The invention is not limited to the embodiment, and may be variously modified within the technical scope of the invention. In addition, the technical field of the invention also includes an electro-optic device with the modification and an electronic apparatus having the electro-optic device.

What is claimed is:

1. An electro-optic device comprising:
   first and second substrates that are disposed to face each other;
   a liquid crystal layer that is disposed between the first and second substrates;
   a pixel area including a plurality of pixels and a peripheral area around the pixel area;
   first electrodes that apply voltage to the liquid crystal layer in the pixel area;
   second electrodes that apply voltage to the liquid crystal layer in the peripheral area for shielding the peripheral area from light;
   a power supply unit that supplies power source potential to the second electrodes to apply the voltage to the liquid crystal layer;
   a seal member surrounding the peripheral area; and
   a boundary light shielding film overlapping an inner portion of the peripheral area surrounding the pixel area at a boundary with the pixel area, the boundary light shielding film blocking a portion of light incident upon the peripheral area,
   wherein the peripheral area includes an outer portion surrounding the boundary light shielding film between the boundary light shielding film and the seal member that is not overlapped with the boundary light shielding film.

2. An electro-optic device comprising:
   first and second substrates that are disposed to face each other;
   a liquid crystal layer that is disposed between the first and second substrates;
   a pixel area including a plurality of pixels and a peripheral area around the pixel area;
   first electrodes that are formed on the first substrate and apply voltage to the liquid crystal layer in the pixel area;
   second electrodes that are formed on the first substrate and apply voltage for shielding the peripheral area from light to the liquid crystal layer;
   a potential supply unit that supplies potential to the second electrodes to apply the voltage to the liquid crystal layer;
   a seal member surrounding the peripheral area; and
   a boundary light shielding film overlapping an inner portion of the peripheral area surrounding the pixel area at a boundary with the pixel area, the boundary light shielding film blocking a portion of light incident upon the peripheral area,
   wherein the peripheral area includes an outer portion surrounding the boundary light shielding film between the boundary light shielding film and the seal member that is not overlapped with the boundary light shielding film.

3. The electro-optic device according to claim 1, wherein at least a part of the second electrodes are electrically connected to each other.

4. The electro-optic device according to claim 1, wherein the seal member is provided to connect the first and second substrates to each other in the peripheral area and is hardened by irradiating with light.

5. The electro-optic device according to claim 1, wherein the voltage applied to the second electrodes is alternating-current voltage.

6. The electro-optic device according to claim 1, further comprising dummy pixels that are provided in a dummy pixel area between the pixel area and the peripheral area and are provided with dummy electrodes imitating the first electrodes,
   wherein the second electrodes are electrically connected to the dummy electrodes, and
   wherein the power supply unit supplies the potential to the second electrodes through the dummy electrodes.

7. The electro-optic device according to claim 1, wherein the power supply unit includes a power supply circuit provided on the first substrate.

8. An electronic apparatus comprising the electro-optic device according to claim 1.

* * * * *